F. T. ROBERTS.
PROCESS OF MAKING INFLATABLE RUBBER ARTICLES.
APPLICATION FILED JULY 5, 1916.
1,310,437.
Patented July 22, 1919.
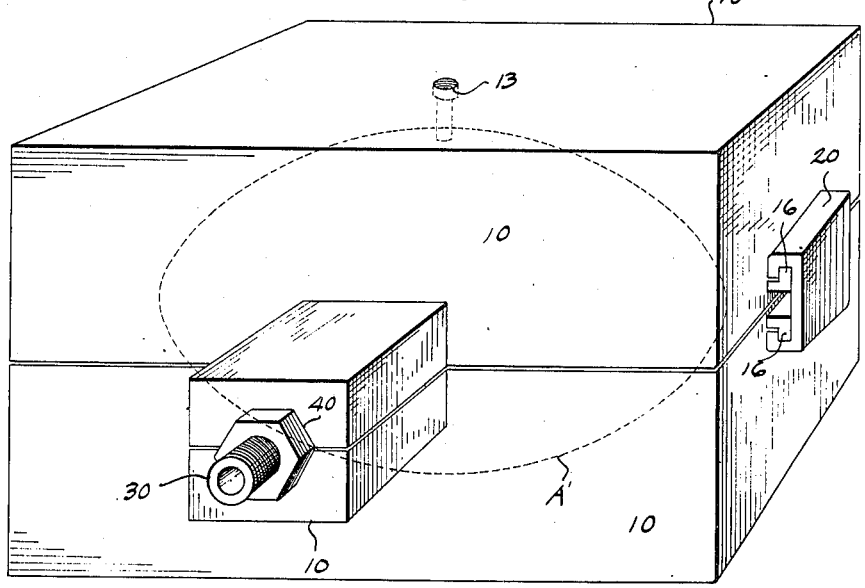
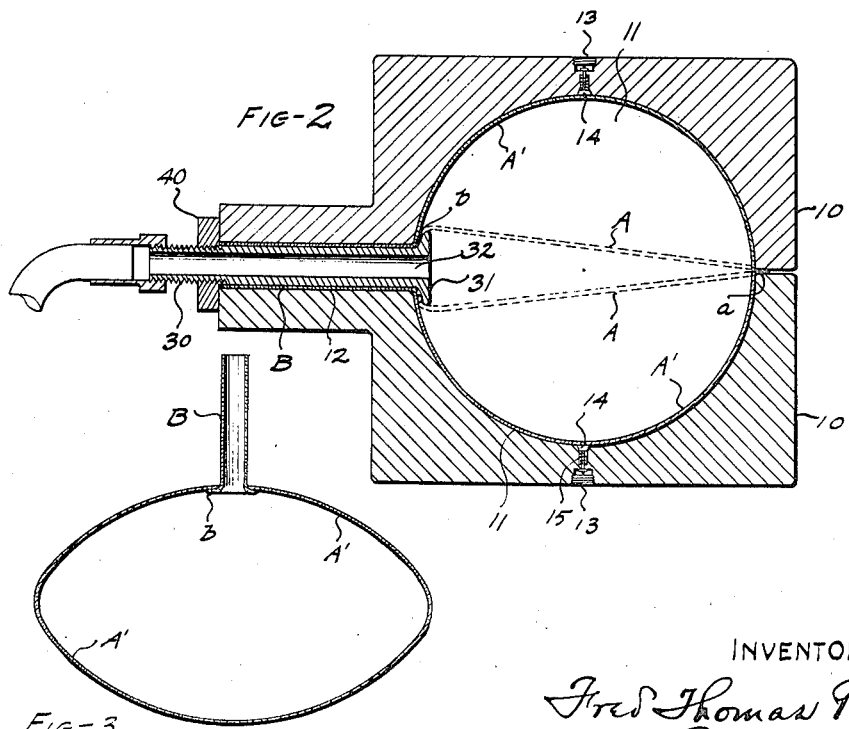
INVENTOR
Fred Thomas Roberts
BY Albert T. Baker
ATTY

UNITED STATES PATENT OFFICE.

FRED THOMAS ROBERTS, OF CLEVELAND, OHIO, ASSIGNOR TO THE PARAMOUNT RUBBER COMPANY, OF CLEVELAND, OHIO, A CORPORATION OF OHIO.

PROCESS OF MAKING INFLATABLE RUBBER ARTICLES.

1,310,437. Specification of Letters Patent. Patented July 22, 1919.

Application filed July 5, 1916. Serial No. 107,490.

*To all whom it may concern:*

Be it known that I, FRED THOMAS ROBERTS, a citizen of the United States, residing at Cleveland, in the county of Cuyahoga and State of Ohio, have invented a certain new and useful Improvement in Processes of Making Inflatable Rubber Articles, of which the following is a full, clear, and exact description, reference being had to the accompanying drawings.

The object of this invention is to enable efficient and economical manufacture of various inflatable rubber articles such as those which have rubber bodies and rubber tubular extensions or connections. My process, for example, may be employed in the manufacture of so-called rubber bladders, used in the interior of foot-balls, in swimming devices, and for various other purposes. A characteristic of these articles is that a rubber tube is connected thereto through which they may be inflated. These articles have heretofore usually been built up by hand, and, in some of them, the rubber tube has been secured in place by cement after the vulcanization of the article proper. It is among the objects of this invention to very materially reduce the cost of manufacture over the old built-up process, and to produce a much tighter joint between the rubber tube and body than where cementing subsequent to vulcanization is employed.

My process, which is hereinafter more fully described, is illustrated in the drawings. Figure 1 is a perspective view of a pair of coöperating mold members adapted to produce the foot-ball bladder illustrated in broken lines; Fig. 2 is a cross section through such two-coacting mold members; Fig. 3 is a view in smaller scale of the article produced by the molds, being a section of a foot-ball bladder along the major axis and through the inflating tube.

As shown in Figs. 1 and 2, 10, 10 indicate a pair of mold members, each of which has a cavity 11 corresponding to half the size of the article to be produced. Extending laterally from each cavity 11, near one edge thereof, is a channel 12, preferably semi-cylindrical in contour. Leading from the cavities 11 are suitable venting openings 13 which may be closed by suitable valves 14 normally held open by springs 15.

When the two mold members described are placed as shown in Fig. 2, they surround a cavity corresponding to the exterior of the article to be made. The mold members are adapted to be clamped in this closed position by suitable means, as for example, a U-shaped clamp 20, the edges of which are at acute angles to each other, and which are adapted to hook over and have a wedging action on wedge-shaped ribs 16, secured to the respective mold members.

30, in Figs. 1 and 2, indicates a stem adapted to occupy the channels 12 of the mold members within a rubber tube, which is to be connected with the body of the article. This stem is provided on its inner end with a head 31 adapted to stand in the interior of the article. Suitable means are provided for drawing the stem outwardly to draw the head into coaction with the inner wall of the mold for a purpose presently explained, this means being shown as a nut 40 screwing onto a threaded end of the stem. The stem is made hollow, as shown at 32, to allow air to pass into the interior.

In making a foot-ball bladder, for example, by the apparatus described, I first lay two sheets of raw rubber across the mouths of the two cavities 11, which, at such time, are separated from each other. These sheets are somewhat larger than the plane across the face of the cavities and thus overlap the edges of the cavities. If desired, the overlapping portion may be cemented to the face of the mold by suitable rubber cement. I place about the shank of the stem 30 a rubber tube, indicated at B in Fig. 2, the inner end of this tube being flanged outwardly, as shown at *b* on the face of the stem head 31. I place this stem with the rubber tube within one of the channels 12 and then place the other mold section over the section which carries the stem. This brings the two edges of the two rubber sheets into contact with each other, while the head on the stem and the flanged end of the tube are between the sheets. The mold members are now clamped together by driving up the wedges 20. The two rubber sheets are thus firmly clamped at the edges of the cavities and about the filling tube B adjacent to the head B' thereof. The nut 40 is now tightened against the mold, drawing the stem outwardly, and thus pressing the flange *b* of the tube tightly against the inner face of the rubber sheets.

When the mold members are first clamped together, as above described, the raw rubber sheets may be in the position shown in broken lines in Fig. 2 and designated A; that is, they may lie approximately diametrically across the combined mold cavity, being spread apart somewhat at the stem head 31. Now I may supply compressed air to the interior through the stem 30, the air in the cavities venting through the openings 13, or I may apply a vacuum to the openings 13, the space between the rubber sheets being relieved by air entering through the stem. In either case there is a preponderance of pressure between the sheets which forces them to seat snugly against the inner face of the mold cavities.

It is also practicable to draw each half of the article into its respective cavity by a vacuum applied to the vent 13 before the mold members are brought together, the position of the molded article being maintained either by such vacuum or by compressed air supplied to the interior.

Whether I use the vacuum or the compressed air, or both the result is that I pneumatically force the material into contact with the mold walls. When such contact is complete the valves 14 become seated by the superior internal pressure. As already explained I also mechanically cause the flange on the tube to be pressed tightly into contact with the interior face of the body. The article is now in condition for vulcanization.

I prefer to vulcanize the article while in the mold in which it is formed. I find, however, that it is feasible to remove the formed article from the mold and pack it in powdered soap-stone in a more or less flat condition, and then vulcanize it.

After vulcanization and the removal of the article from the mold, the flange a at the junction of the two halves is trimmed off, and the stem 30 is removed from the tube B, which is sufficiently stretched to allow it to pass. The article is thus complete, having the finished form shown in Fig. 3, where A' A' is a spheroidal body made from the sheets A A, and B is the filling tube vulcanized thereto.

Having thus described my invention, what I claim is:

1. The process of making inflatable rubber articles consisting of placing a rubber filling tube about a stem, pneumatically forming the body of the article causing such body to engage the tube, vulcanizing the body and tube together, and withdrawing the stem.

2. The process of making inflatable rubber articles consisting of placing a filling tube about a stem having a head, forming the body of the article to embrace the tube with the head of the stem on the interior of the article, vulcanizing the article and withdrawing the stem.

3. The process of making inflatable rubber articles consisting of placing sheets of raw rubber stock across the mouths of two mold cavities, bringing such sheets together edge to edge upon each other and upon an interposed rubber filling tube, and vulcanizing the sheets to each other and to the filling tube.

4. The process of making inflatable rubber articles having a body with a rubber filling tube, consisting of placing sheets for the body portion across the mouths of two mold members, bringing such sheets into contact at their edges and into contact with the filling tube, causing the body portion to seat in the cavities to form the article, and vulcanizing the parts together.

5. The process of making inflatable rubber articles consisting of placing sheets of raw rubber stock across the mouths of two mold cavities, bringing such sheets together edge to edge upon each other and upon an interposed rubber filling tube within which is a removable stem, vulcanizing the sheets to each other and to the filling tube, and removing the stem.

6. The process of making inflatable rubber articles having a body with a filling tube, consisting of placing the body portion across the mouths of two mold members in contact with the filling tube which surrounds a removable stem, causing the body portion to seat in the cavities to form the article, vulcanizing the parts together, and removing the stem.

7. The process of making inflatable rubber articles consisting of placing sheets of raw rubber stock across the mouths of two mold cavities, bringing such sheets together edge to edge upon each other and upon an interposed rubber filling tube within which is a removable hollow stem through which air may be supplied to the interior, vulcanizing the parts together, and removing the stem.

8. The process of making inflatable rubber articles consisting of placing sheets of raw rubber stock across the mouths of two mold cavities, bringing such sheets together edge to edge upon each other and upon an interposed rubber filling tube within which is a hollow stem, causing the sheets to seat in the mold cavities while air is supplied through the stem, and vulcanizing the sheets to each other and to the filling tube.

9. The process of making hollow inflatable articles consisting of placing two sheets of raw rubber stock across the mouths of two mold cavities, placing a rubber tube about a hollow stem, bringing the mold members together upon such interposed tube and stem in such a manner that the edges of the sheets contact with the tube around the stem and contact with each other around the article to be made, pneumatically forcing the sheets against the walls of the mold cavities, vulcanizing the parts together, and thereafter removing the stem.

10. The process of making hollow inflatable articles consisting of placing two sheets of raw rubber stock across the mouths of two mold cavities, bringing the mold members together upon an interposed rubber tube having a flange at its inner end in such a manner that the edges of the sheets contact with the tube and contact with each other around the article to be made, causing the flange on the tube to press against the inner faces of the sheets, pneumatically forcing the sheets against the walls of the mold cavities, and vulcanizing the parts and tube together.

11. The process of making hollow inflatable articles having rubber filling tubes connected therewith, consisting of placing two sheets of raw rubber across the mouths of two mold cavities, placing a flanged rubber tube about a headed stem, bringing the mold members into coaction upon the interposed tube and stem to cause the sheets to come into edge contact and to embrace the tube, clamping the mold members together, and drawing the stem outwardly to press the flange of the tube against the inner face of the body.

12. The process of making hollow inflatable articles having rubber filling tubes connected therewith consisting of placing two sheets of raw rubber across the mouths of two mold cavities, placing a flanged rubber tube about a hollow stem having a head, bringing the mold members into coaction upon the interposed tube and stem to cause the sheets to come into edge contact and to embrace the tube, drawing the stem outwardly to cause the head thereon to press the tube-flange tightly against the inner wall of the sheet members, vulcanizing the parts, and removing the stem.

13. The process of making inflatable rubber articles consisting of placing a rubber filling tube about a hollow stem, pneumatically forming the body of the article against the walls of a mold, vulcanizing the body and tube together, and withdrawing the stem.

14. The process of making hollow articles consisting of placing plastic stock across the mouths of mold cavities having vents, bringing such stock into contact with other stock and into contact with a tube to be permanently affixed thereto, supplying fluid under pressure to the interior of the article through such tube, the air in the cavities issuing through such vents, and thereafter vulcanizing the article with the said tube in place.

15. The process of making hollow articles consisting of placing plastic stock across the mouths of mold cavities having vents, bringing such stock together edge to edge, supplying fluid under pressure to the interior of the article through a tubular member leading thereto, the air in the cavities issuing through such vents, thereafter closing the vents, and vulcanizing the article in the same mold.

16. The process of making hollow rubber articles consisting of placing sheets of stock across the mouths of mold cavities having vents, bringing such stock together edge to edge upon an interposed tubular member, supplying fluid under pressure to the interior of the article through such tubular member, the air in the cavities issuing through such vents, thereafter closing the vents, and vulcanizing the article in the same mold.

17. The process of making hollow rubber articles, consisting of placing sheets of stock across the mouths of mold cavities, bringing such stock together edge to edge, placing a tubular filling device having an internal head so that its head shall be in the interior of the article and its shank leading therefrom, drawing the shank of said filling device outwardly to cause the head to engage the interior of the article, supplying fluid to the interior through such tubular filling device, and curing the article while such fluid is within it.

18. The process of making hollow rubber articles which have a tubular filling device, consisting of placing sheets of stock across the mouths of mold cavities, bringing such stock together edge to edge upon an interposed tubular filling device having an internal head, forcing said filling device outwardly to cause the head to engage the interior of the article supplying fluid to the interior through such tubular filling device, and curing the article while such fluid is within it.

19. The process of making hollow rubber articles which have a tubular filling device, consisting of placing sheets of stock across the mouths of mold cavities having vents, bringing such stock together edge to edge upon an interposed tubular filling device having an internal head, drawing said filling device outwardly to cause the head to engage the interior of the article, supplying fluid to the interior through such tubular filling device, closing the vents, and vulcanizing the article in the same mold.

20. The process of making hollow rubber articles consisting of stretching flat sheets of stock across the mouths of mold cavities, bringing two of such mold members carrying stretched sheets together upon an interposed tubular filling device, and supplying compressed fluid to the space between the sheets through said filling device while venting the space between the sheets and the base of the cavities, said fluid having a greater pressure than can be retained simply by the adhesion of the sheets, and vulcanizing the article with such contained pressure without removing it from the mold.

21. The process of making hollow rubber articles consisting of stretching flat sheets of stock across the mouths of mold cavities, bringing two of such mold members with stretched sheets together upon an interposed tubular filling device, supplying compressed fluid to the space between the sheets through said filling device while venting the space between the sheets and the base of the cavities, then closing the venting openings, and vulcanizing the article in the same mold.

22. The process of making hollow rubber articles having a tubular filling device, consisting of placing sheets of stock across the mouths of mold cavities, each cavity being provided with a lateral groove, bringing the mold members together upon an interposed filling tube which occupies such lateral grooves and which has a head, drawing the filling tube outwardly to cause its head to engage the inner face of the combined article, supplying compressed fluid to the interior through such tube while venting the cavities, and vulcanizing the article.

23. The process of making hollow rubber articles having a tubular filling device, consisting of placing sheets of stock across the mouths of mold cavities, each cavity being provided with a lateral groove, bringing the mold members together upon an interposed filling tube which occupies such lateral grooves and which has a head, clamping the mold sections together, whereby the two portions of stock are forced together edge to edge to each other and about the filling tube, drawing the filling tube outwardly to cause its head to engage the inner face of the combined article, supplying compressed fluid to the interior through such tube while venting the cavities, closing the vents, and vulcanizing the article while in the same mold.

In testimony whereof, I hereunto affix my signature.

FRED THOMAS ROBERTS.